Feb. 3, 1959 J. PROVAZ 2,872,568

DEVICE FOR SELECTIVE RECEPTION OF ELECTROMAGNETIC WAVES

Filed April 21, 1954 2 Sheets-Sheet 1

INVENTOR.
Josef Provaz
BY Richard Low
Ag't

DEVICE FOR SELECTIVE RECEPTION OF ELECTROMAGNETIC WAVES

Filed April 21, 1954 2 Sheets-Sheet 2

INVENTOR.
Josef Provaz

BY

Ag't 2,872,568
Patented Feb. 3, 1959

2,872,568

DEVICE FOR SELECTIVE RECEPTION OF ELECTROMAGNETIC WAVES

Josef Provaz, Prague, Czechoslovakia, assignor to Tesla, narodni podnik, Prague, Czechoslovakia, a corporation of Czechoslovakia Application April 21, 1954, Serial No. 424,697

Claims priority, application Czechoslovakia April 30, 1953

2 Claims. (Cl. 250—20)

This invention relates to a device for selective reception of electromagnetic waves.

Several receivers with separate aerials for receiving signals from remote stations in the presence of fading have already been used. These receivers select the strongest signal from one of the aerials relying on the fact that several aerials with different directional diagrams are never subject to the same degree of fading. Such known systems are perfect selective devices for signals under all types of modulation, but they are rather complicated and expensive.

It has been found that in many practical cases it is not necessary to select the strongest signal received. It is sufficient if the intensity of the received signal has a predetermined level.

The object of this invention is to provide a device which accomplishes selective reception by means of a single receiver of current design employing two aerials.

In accordance with this invention either of the two aerials can be made to supply signals into the receiver. One of the aerials remains in the active position where it supplies signals into the receiver, as long as the intensity of the signal received by this aerial is of satisfactory level. If this signal falls below the predetermined level, the first aerial is automatically removed from the working position and the second aerial is substituted therefor. The change-over is accomplished by means of a voltage derived from the rectified signal of the first aerial in the working position as soon as its signal falls below the predetermined level.

The change-over voltage is conveniently derived from the automatic gain control circuit of the receiver, and it is fed into a control tube connected as a direct current amplifier so that with a satisfactory signal in the active aerial, that is to say in the aerial which feeds signals into the receiver, the control tube is blocked. As soon as the intensity of the signal becomes unsatisfactory, the control tube passes current and actuates the change-over circuits which control circuits which connect the other aerial to the receiver. The change-over circuits and the connecting circuits of the aerials consists conveniently of tubes.

The control tube is connected with the change-over circuits by means of a device which is conveniently formed of a polarised relay and which makes it possible that the aerial in the active position is left connected with the receiver as long as its signal is of satisfactory level, even if the other aerial receives a stronger signal. But the other aerial is switched over into the working position as soon as the signal of the first aerial falls below the predetermined level.

The invention will be best understood from the following specification to be read in conjunction with the accompanying drawings in which—

Figure 1:
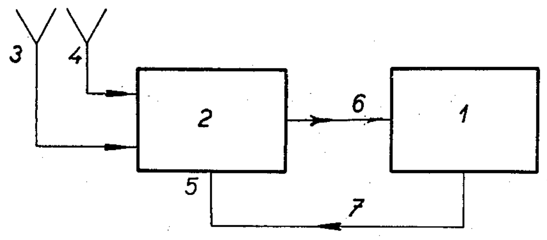
Fig. 1 is a block diagram illustrating the principle of the invention.

Referring to Fig. 1, block 1 indicates a receiver of current design. It receives signals by line 6 from block 2 which indicates the change-over and connecting circuits of aerials 3 and 4. The circuits indicated by block 2 are controlled by the rectified voltage from lines 5, 7 which is derived from the rectified signal of one of the aerials 3 or 4 in the working position.

The circuits represented by block 2 will now be described in more detail with reference to Fig. 2.

The control tube 8 having a high slope is connected as a direct current amplifier. It is controlled by the automatic gain control voltage supplied from a received, not shown in the drawing, to point 113. The magnitude of the control voltage is adjusted by means of a potentiometer 114. The condition of the control valve adjusts the potential of point 29. This potential controls a change-over tube 9 illustrated as a duotriode with triodes 11 and 12. Between the points 32 and 33 of the voltage dividers formed by resistors 23 and 30 and resistors 25 and 31 in the anode circuits of the two triodes 11 and 12, respectively, there is connected a polarised relay 35 having a movable contact arm 17 with two fixed contacts 18 and 19 through which the potential of point 29 may be connected to the control grid of either triode 11 or 12. The aerials 50 and 51 are connected to the control grids of triodes 13 and 14, respectively, of a duotriode 10, and the anodes of triodes 13 and 14 are connected to the aerial terminals 36 of the receiver. Chokes 37 and 38 connected in the anode circuits of the connecting triodes 13 and 14, and capacitors 39 and 40 form a filter which prevents high frequencies from reaching the anode source. Duotriode 10 amplifies the received signal. As will be explained below, there is always only one triode of each of the duotriodes 9 and 10 which is conductive, whereas the second triode of each duotriode is blocked.

Figure 2:
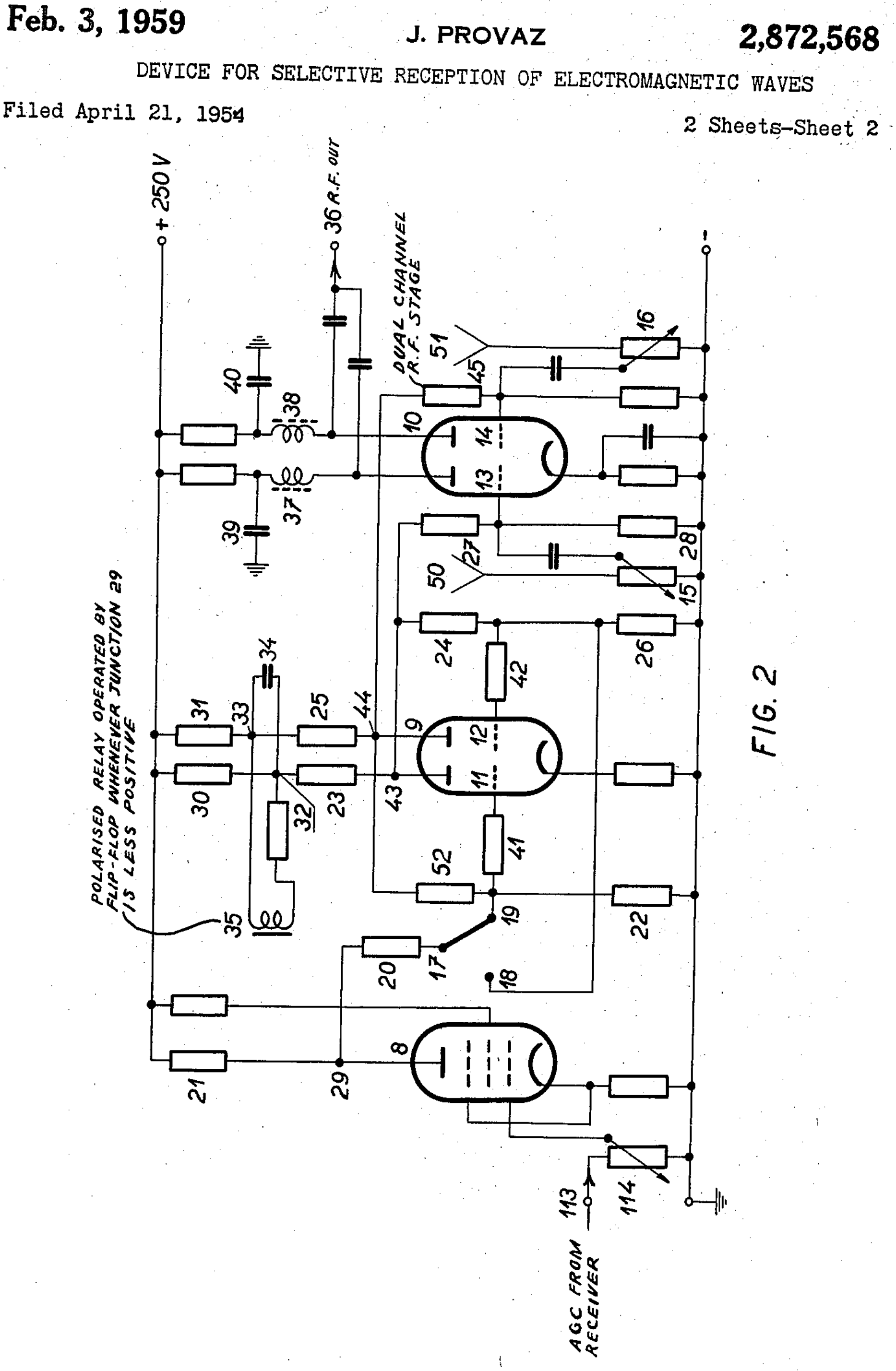
Fig. 2 is a detail wiring diagram of the change-over circuits and the connecting circuits of the aerials.

Let us suppose that at the beginning of the reception, the device is in the position as shown in Fig. 2. The contact arm 17 engages fixed contact 19 and aerial 51 is in the active position and receives a satisfactory signal. In this case the automatic gain control voltage supplied by the receiver to point 113 has a high negative value. It is fed through potentiometer 114 to the grid of the control tube 8 and blocks the latter. The potential of point 29 is therefore sufficiently positive so that the control grid of triode 11 receives, through resistor 20, contact arm 17, fixed contact 19, and resistor 41, a positive bias which makes this triode conductive. There is now a voltage drop across resistor 23. The corresponding negative potential of point 43 is supplied through resistors 24 and 42 to the control grid of triode 12, and through resistor 27 to the control grid of triode 13, so that triodes 12 and 13 are blocked. Therefore, the signal received by aerial 50 cannot reach the receiver. Between the points 32 and 33 in the anode circuits of triodes 11 and 12, there is a potential difference of such polarity that the contact arm 17 of polarised relay 35 remains in position 19.

If now, due to fading, the intensity of the signal received by the active aerial 51 falls below the predetermined level, the voltage supplied to point 113 is correspondingly less negative, the negative bias of the grid of control tube 8 is reduced and the control tube begins to pass current. The magnitude of the automatic gain control voltage which opens tube 8 can be adjusted by potentiometer 114. The voltage drop across resistor 21 reduces the potential of point 29 so that triode 11 becomes blocked. Therefore, the potential of point 43 increases to a positive value which opens triodes 12 and 13. Consequently, aerial 50 is switched into the active position. Since, however, the potential of point 44 is reduced to a more negative value due to triode 12 passing current through resistor 25, the control grid of triode 14 receives a negative bias which blocks this triode. Aerial 51 is therefore removed from the active position and the signal received by this aerial cannot reach the receiver.

Under these conditions, the polarity of the voltage difference between points 32 and 33 is changed, and relay 35 moves its contact 17 into engagement with fixed contact 18. As will be explained below, this change-over of contact 17 is necessary, because if the second aerial is connected to the receiver, there may be in this aerial a signal of satisfactory intensity or of lower intensity. Since the device according to the invention looks only for a signal of satisfactory intensity and not for a signal of highest intensity, aerial 50 should remain connected to the receiver if the signal therein is satisfactory, even if in the meantime the intensity of the signal in aerial 51 increases to a value above the signal in aerial 50.

Let us assume, in the first place, that the signal of aerial 50, after contact 17 has been moved into engagement with contact 18, is of satisfactory intensity. The negative automatic gain control voltage increases again to a value which is adjustable by potentiometer 114 and is sufficient to block tube 8. The potential of point 29 increases, so that the bias supplied to the grid of triode 12 through resistor 20, contacts 17 and 18 and resistor 42 keeps triode 12 open, and through the voltage drop across resistor 25 point 44 supplies the blocking voltage for triodes 11 and 14, so that aerial 51 is disconnected from the receiver.

Let us now assume that after contact 17 has been moved into engagement with contact 18, the signal in aerial 50 is not satisfactory, or that, during operation, the intensity of the signal has dropped below the predetermined level. The negative automatic gain control voltage supplied through potentiometer 114 to the control grid of tube 8 is not sufficient to block the latter so that the tube 8 passes current, and the reduced potential of point 29, reaching the grid of triode 12 through contact 17 in engagement with contact 18, blocks the triode 12. But the increased potential of point 44, fed through resistors 52 and 41 to the control grid of triode 11, and through resistor 45 to the control grid of triode 14, renders the triodes 11 and 14 open or conductive, whereas the reduced potential point 43 fed through resistors 24 and 42 to the control grid of triode 12, and through resistor 27 to the control grid of triode 13, blocks the triodes 12 and 13. Hence, between the points 32 and 33, there appears again a voltage difference of such polarity, that relay 35 moves its contact 17 into engagement with contact 19.

Therefore, automatic change-over of the aerials is accomplished, if the intensity of the received signal in the active aerial is below the predetermined level.

As a rule one change-over is enough for finding the signal of satisfactory intensity. In the majority of cases this can be achieved by suitably adjusting potentiometer 114 according to local conditions of reception. If, however, in one aerial, due to its accidental directional effects the mean value of the signal level is greater than in the second aerial, approximately equal amplification of the received signal from both aerials can be achieved by suitably adjusting potentiometers 15 and 16.

Since the time constant of the receiver automatic gain control circuit is usually greater than the time constant of the change-over circuits of the aerial, the time constants of the change-over circuits must be artificially increased, that is to say, the change-over of the aerials must be delayed to prevent repeated switching over during volume control. This artificial delay can be achieved for example, as indicated in Fig. 2, by connecting a capacitor 34 in parallel with the winding of the polarised relay 35.

It is, of course, obvious to the expert in the art that instead of duotriodes 9 and 10 it is possible to use duopentodes or separate triodes or pentodes.

The device functions well if two horizontal aerials spaced apart from each other by at least 10 m. are used having different directional diagrams. As has already been mentioned above, the input level of the signal can be adjusted by adjusting potentiometers 15 and 16.

The described change-over circuits can be used with a receiver of usual construction, as long as it contains a device for automatic gain control. The device shown in Fig. 2 is a wideband one, because it uses an untuned aerial input.

Figure 3:
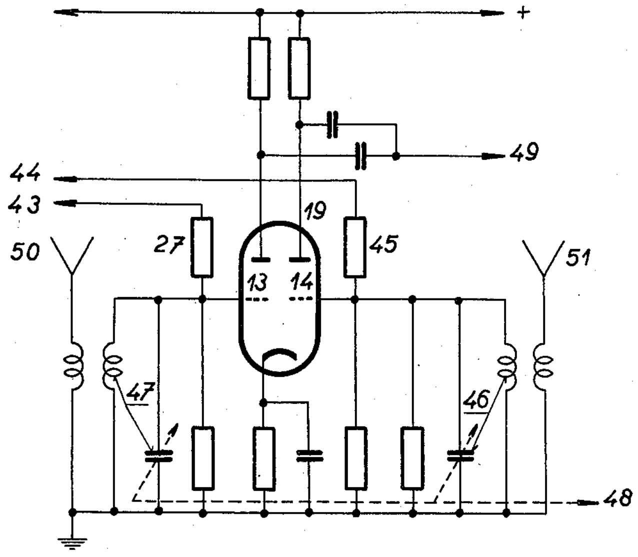
Fig. 3 shows a modification of the circuits of Fig. 2.

Fig. 3 illustrates a modification of the invention in which it is possible to select the frequency range, for example by means of the tuned input circuits 46 and 47 shown in the drawing, whereby a better signal to noise ratio and better selectivity is obtained. In Fig. 3, the device is shown as being directly built-in a superheterodyne receiver. Arrow 48 leads to the third part of a three-gang capacitor not shown in the drawing, which tunes the local oscillator, and arrow 49 leads to the mixer. For the sake of simplicity Fig. 3 shows only the aerial part of the device which forms a preselective stage. The components which are the same as in Fig. 2 are designated by the same reference numbers. Arrows 43 and 44 on Fig. 3 lead to points 43 and 44 illustrated in Fig. 2. The remaining part of the device, not shown in Fig. 3 of the drawings, is the same as in Fig. 2.

It is obvious from the above description, that the device for selective reception of electromagnetic waves in accordance with this invention has many advantages over the previously known devices in all cases where it is not necessary to look for the strongest signal, but where a signal of predetermined intensity is sufficient. A receiver with two aerials is sufficient, and the device can also be used with a receiver of normal design, particularly if it contains a device for automatic gain control, without requiring any special adjustments of the receiver. The device according to the invention is simple, and its control is easily achieved by means of three control elements, that is to say, potentiometers 114, 15 and 16, shown in Fig. 2.

What I claim is:

1. In a dual diversity receiving system; the combination of two different aerials having connecting stages, a receiver having a negative automatic gain control potential and common input means from said connecting stages, means including a combination of polarised relays and a flip-flop circuit, said polarised relays having two stable positions and at least one pair of fixed contacts connected to the control grids of said flip-flop circuit, and at least one moving contact connected at any instant to one of said fixed contacts, the windings of said polarised relays being connected between the anode circuits of the tubes of said flip-flop circuit so that the control voltage developed from said automatic gain control potential of the receiver is led, at any instant, to the control grid of the then conductive tube of said flip-flop circuit, each tube of said flip-flop circuit having a resistance for developing a voltage drop dependent on the anode current of the tubes of said flip-flop circuit, and means coupled to said resistance for controlling the connecting stages of said aerials by means of said voltage drop.

2. In a dual diversity receiving system; the combination of two different aerials having connecting stages, a receiver having a negative automatic gain control potential and common input means from said connecting stages, means including a combination of polarised relays and a flip-flop circuit, said polarised relays having two stable positions and at least one pair of fixed contacts connected to the control grids of said flip-flop circuit, and at least one moving contact connected at any instant to one of said fixed contacts, the winding of said polarised relays being connected between the anode circuits of the tubes of said flip-flop circuit so that the control voltage developed from said automatic gain control potential of the receiver, connected to said moving contact is led, at any instant, to the control grid of the then conductive tube of said flip-flop circuit, the control grid of the then nonconductive tube of said flip-flop circuit being, at any instant, disconnected from said control voltage, each tube of said flip-flop circuit having a resistance for developing a voltage drop dependent on the anode current of the tubes of said flip-flop circuit, and means coupled to said resistance for controlling the connecting stages of said aerials by means of said voltage drop.

References Cited in the file of this patent

UNITED STATES PATENTS

| | | |
|---|---|---|
| 2,059,081 | Beers | Oct. 27, 1936 |
| 2,243,118 | Peterson | May 27, 1941 |
| 2,414,111 | Lyond | Jan. 14, 1947 |
| 2,447,057 | Crosby | Aug. 17, 1948 |
| 2,485,576 | Dodington | Oct. 25, 1949 |
| 2,495,826 | Schock | Jan. 31, 1950 |
| 2,644,885 | Atwood | July 7, 1953 |
| 2,685,643 | Fisk | Aug. 3, 1954 |